(12) United States Patent
Ogawa et al.

(10) Patent No.: US 9,373,981 B2
(45) Date of Patent: Jun. 21, 2016

(54) STATOR OF MOTOR AND MOTOR

(75) Inventors: Takashi Ogawa, Osaka (JP); Yuichi Yoshikawa, Osaka (JP); Ikuo Ozaki, Shiga (JP); Toshiyuki Tamamura, Shiga (JP); Hirokazu Yamauchi, Wakayama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 345 days.

(21) Appl. No.: 14/114,290

(22) PCT Filed: Apr. 18, 2012

(86) PCT No.: PCT/JP2012/002696
§ 371 (c)(1),
(2), (4) Date: Oct. 28, 2013

(87) PCT Pub. No.: WO2012/147310
PCT Pub. Date: Nov. 1, 2012

(65) Prior Publication Data
US 2014/0055001 A1 Feb. 27, 2014

(30) Foreign Application Priority Data
Apr. 28, 2011 (JP) .................................. 2011-100469

(51) Int. Cl.
*H02K 1/14* (2006.01)
*H02K 1/16* (2006.01)

(52) U.S. Cl.
CPC ................ *H02K 1/165* (2013.01); *H02K 1/146* (2013.01); *H02K 2201/09* (2013.01)

(58) Field of Classification Search
None
See application file for complete search history.

(56) References Cited

U.S. PATENT DOCUMENTS 3,202,851 A * 8/1965 Dehlendorf .............. H02K 1/16
29/521
4,364,169 A * 12/1982 Kawano ............... H02K 15/026
219/93

(Continued)

FOREIGN PATENT DOCUMENTS

| CN | 101682243 A | 3/2010 |
| JP | 2000-037050 A | 2/2000 |

(Continued)

OTHER PUBLICATIONS

International Search Report for International Application No. PCT/JP2012/002696, dated Jul. 24, 2012, 2 pages.

(Continued)

*Primary Examiner* — Tran Nguyen
(74) *Attorney, Agent, or Firm* — Brinks Gilson & Lione

(57) ABSTRACT

Provided is a stator of a motor which is capable of reducing a loss generated in a motor and thereby attaining a high-efficient motor, and a motor including the stator. A stator of a motor comprises a stator core including a plurality of plate members stacked together; the stator core including: a yoke of a tubular shape; and teeth each of which includes an extending portion extending inward in a radial direction of the yoke from the yoke and an increased-width portion formed at a tip end of the extending portion so as to have a greater width than the extending portion in a circumferential direction of the yoke; wherein the extending portion has a constant-width portion extending radially in a straight-line shape so as to have a constant circumferential width, a narrower portion having a smaller circumferential width than the constant-width portion, and a clamp portion for securing the plurality of plate members to each other; and wherein the clamp portion is provided in the constant-width portion.

8 Claims, 11 Drawing Sheets

(56) References Cited

U.S. PATENT DOCUMENTS

| | | | | |
|---|---|---|---|---|
| 5,338,996 | A | * | 8/1994 | Yamamoto ............... H02K 1/26 310/216.048 |
| 5,886,441 | A | * | 3/1999 | Uchida ................ H02K 1/2773 310/156.57 |
| 2009/0085422 | A1 | * | 4/2009 | Kusawake ............. H02K 1/148 310/216.067 |
| 2010/0045131 | A1 | | 2/2010 | Li et al. |
| 2012/0126651 | A1 | | 5/2012 | Li et al. |

FOREIGN PATENT DOCUMENTS

| | | |
|---|---|---|
| JP | 2002-354716 A | 12/2002 |
| JP | 2003-143782 A | 5/2003 |
| JP | 2007-014050 A | 1/2007 |
| JP | 2008-278642 A | 11/2008 |
| JP | 2010-158095 A | 7/2010 |
| WO | WO 2008/044703 A1 | 4/2008 |

OTHER PUBLICATIONS

Satoh, Mitsuhiko, et al., "Stator Shape Improvement to Decrease Iron Loss Caused by Shrink Fit Utilizing Physical Properties of Electrical Steel Sheet," *IEEJ Trans. IA*, vol. 127, No. 1, pp. 60-68, 2007, and partial English translation thereof.

Office Action and Search Report, and partial English language translation thereof, in corresponding Chinese Application No. 201280016581.7, dated May 20, 2015, 8 pages.

\* cited by examiner

STATOR OF MOTOR AND MOTOR

RELATED APPLICATIONS

This application is a 371 application of PCT/JP2012/002696 having an international filing date of Apr. 18, 2012, which claims priority to JP 2011-100469 filed Apr. 28, 2011, the entire contents of which are incorporated herein by reference.

TECHNICAL FIELD

The present invention relates to a stator of a motor, and a motor including the stator.

BACKGROUND ART

It is known that as a method of changing a speed of a motor such as a brushless motor (IPM motor) for use in a compressor or the like of air conditioner equipment, a PWM drive method that modulates a pulse width by changing a duty ratio of a pulsed wave based on a particular carrier frequency is used. In the PWM drive method, to attain a waveform of a current flowing through the motor, the pulse width is modulated using the carrier frequency having a higher frequency than the current waveform. Therefore, a higher harmonic component corresponding to the carrier frequency in the PWM is superposed on the current waveform.

A loss of the motor is classified into an iron loss indicating a loss in a case where a core is magnetized and a copper loss indicating a loss caused by an electric resistance of a coil during excitation. The iron loss is a sum of a hysteresis loss attributed to a magnetic characteristic of the core and an eddy-current loss caused by electromagnetic induction inside of the core. It is known that a ratio of the hysteresis loss and a ratio of the eddy-current loss increase as a frequency of alternating magnetic flux (alternating current) for rotating the motor is higher. Because of this, if the higher harmonic component corresponding to the carrier frequency is superposed on the alternating current flowing through the motor, higher harmonic magnetic flux is generated by a current corresponding to the higher harmonic component, resulting in an increase in the iron loss. In particular, the carrier frequency in the PWM drive tends to increase as a size of the brushless motor decreases and an output of the brushless motor increases. Therefore, a reduced efficiency caused by the increase in the iron loss presents severe problems.

As a solution to such a problem, it is known that a yoke of a stator is configured to have portions in which a stress is made different from that of another portion of the yoke, to suppress the higher harmonic magnetic flux generated by the PWM drive (e.g., see Patent Literature 1). Specifically, for example, hollow portions, swaged portions, etc., are provided in an outer peripheral surface or inner peripheral surface of the yoke, and the stator is fastened to an interior of a case by shrink-fit, etc., to increase a compressive stress in the hollow portions, the swaged portions, etc.

Patent Literature 1: Japanese-Laid Open Patent Application Publication No. 2010-158095

SUMMARY OF THE INVENTION

Technical Problem

FIG. 15 is a view showing a result of analysis of a stress distribution in a conventional stator. In FIG. 15, a darker color (darker color tone) represents that an applied stress is greater. As can be seen from FIG. 15, in the conventional stator fastened to the interior of the case by shrink-fit, etc., like that disclosed in Patent Literature 1, portions of the yoke which are higher in compressive stress than teeth located inward relative to the yoke are applied with a greater stress by the above stated portions in which the stress is made different.

However, a problem has been pointed out, in which if the stress inside of the yoke increases in the stator fastened to the interior of the case by shrink-fit, the iron loss significantly increases irrespective of the frequency of the alternating magnetic flux (e.g., Mitsuhiko Sato, Seiichi Kaneko, Mutsuo Tomita, Shinji Doki, Shigeru Okuma "Stator Shape Improvement to Decrease Iron Loss Caused by Shrink Fit, Utilizing Physical Properties of Electrical Steel Sheet" The transactions of the Institute of Electrical Engineers of Japan. D (see IEEJ Trans. IA, Vol. 127, No. 1, 2007 pp. 60-68)). Therefore, if the compressive stress in the yoke is increased by using the configuration of Patent Literature 1, the iron loss may increase as a whole even though the higher harmonic magnetic flux in a localized region can be suppressed.

A stator core which is a component of the stator is formed in such a manner that a plurality of plate members (electromagnetic steel plates) are stacked together. To unitarily secure the plurality of plate members, the stator core composed of the plurality of plate members is formed with a clamp portion for unitarily securing the plurality of plate members, by deforming a portion of the plurality of plate members. In the clamp portion formed in the stator core in this way, a residual stress caused by the deformation exists, which degrades a magnetic characteristic. Therefore, it is necessary to dispose the clamp portion so that the degradation of a motor characteristic is difficult to occur.

The present invention is directed to solving the above described problem associated with the prior art, and an object of the present invention is to provide a stator of a motor which is capable of reducing a loss generated in a motor to attain a high-efficient motor, and a motor including the stator.

Solution to Problem

According to an aspect of the present invention, there is provided a stator of a motor comprising: a stator core including a plurality of plate members stacked together; the stator core including: a yoke of a tubular shape; and teeth each of which includes an extending portion extending inward in a radial direction (hereinafter will be simply referred to as radially) of the yoke from the yoke and an increased-width portion formed at a tip end of the extending portion so as to have a greater width than the extending portion in a circumferential direction (hereinafter will be simply referred to as circumferential) of the yoke; wherein the extending portion has a constant-width portion extending radially in a straight-line shape so as to have a constant circumferential width, a narrower portion having a circumferential width smaller than a circumferential width of the constant-width portion, and a clamp portion for securing the plurality of plate members stacked together; and wherein the clamp portion is provided in the constant-width portion.

In accordance with this configuration, since the narrower portion having a smaller circumferential width than the constant-width portion is provided in a portion of each of the teeth, a density of magnetic flux flowing through the narrower portion in each of the teeth increases, and local magnetic saturation occurs in the narrower portion, so that higher harmonic magnetic flux is filtered in the narrower portion. In this case, since no stress is generated in the tooth, it becomes possible to prevent a situation in which an iron loss increases due to an increase in a compressive stress exerted on the stator. In addition, since the narrower portion is provided in each of the teeth which is relatively higher in magnetic flux density in the stator, only the higher harmonic magnetic flux can be filtered and removed appropriately. Furthermore, the clamp portion for securing the plurality of plate members constituting the stator core to each other, is provided in the constant-width portion such that it is not provided in the narrower portion. After intensive study, the inventors of the present invention found out that in a case where the narrower portion is provided in a portion of the tooth of the stator, a decrease in the torque constant can be prevented by providing the clamp portion for securing the plurality of plate members, in the constant-width portion. It is estimated that it becomes possible to prevent an increase in a copper loss in a case where the extending portion including the narrower portion is provided with the clamp portion, by providing the clamp portion in the constant-width portion. Therefore, by providing the narrower portion in the extending portion of the stator core and by providing the clamp portion in the constant-width portion, a loss generated in a motor can be reduced, and as a result, a high-efficient motor can be attained.

The clamp portion may be provided such that a radial end portion of the clamp portion which is closer to the narrower portion is located in the vicinity of a boundary between the narrower portion and the constant-width portion. In accordance with this, by providing the clamp portion outside of the narrower portion and in a portion of the constant-width portion which is closest to the narrower portion, a decrease in the torque constant can be suppressed to a minimum level while preventing an increase in the iron loss.

The clamp portion may have a circumferential width which is equal to or less than a half of the circumferential width of the constant-width portion. This makes it possible to effectively lessen an effect on the main magnetic flux passing through inside of the extending portion, which would be caused by a residual stress generated by providing the clamp portion.

The narrower portion may be provided at a base end portion of the extending portion; and the constant-width portion may extend radially inward from a tip end of the narrower portion. This makes it possible to filter harmonic magnetic fluxes of adjacent teeth which are interlinked via the yoke. Therefore, the higher harmonic magnetic flux can be suppressed effectively.

Circumferential both end portions of the narrower portion may have a circular-arc shape in a cross-section perpendicular to a center axis of the yoke. With this shape, the magnetic flux flows gently in the narrower portion and a change amount of magnetic vectors in a connection potion at which the narrower portion is connected to another portion is reduced. As a result, an increase in the iron loss can be suppressed.

A ratio of a smallest value d1 of the circumferential width of the narrower portion with respect to a circumferential width d2 of the constant-width portion may be $0.70 < d1/d2 < 0.98$. With this ratio, the higher harmonic magnetic flux can be suppressed more effectively.

According to another aspect of the present invention, a motor comprises the stator of the motor having the above configuration. In this configuration, the loss can be reduced without reducing the torque constant in the motor of an equal size, and as a result, the high-efficient motor can be attained.

The above and further objects and features of the invention will more fully be apparent from the following detailed description with accompanying drawings.

Advantageous Effects of the Invention

The present invention has been configured as described above, and has advantages that a loss generated in a motor can be reduced, and as a result, a high-efficient motor can be attained.

DETAILED DESCRIPTION OF THE PREFERRED EMBODIMENTS

Figure 1:
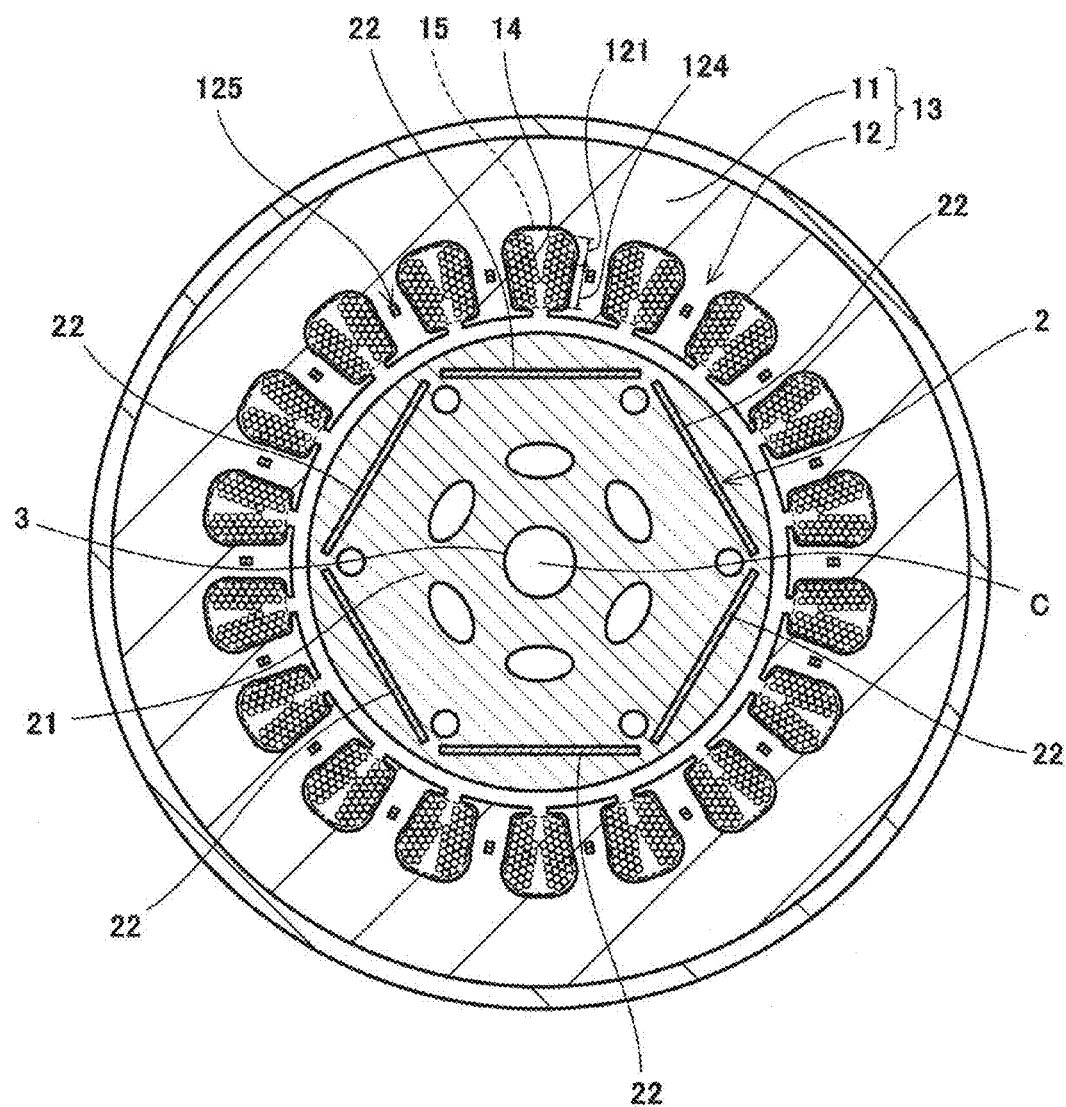
FIG. 1 is a cross-sectional view showing an example of a cross-sectional structure of a motor including a rotor of a motor according to an embodiment of the present invention.

Hereinafter, an embodiment of the present invention will be described with reference to the drawings. Throughout the drawings, the same or corresponding components are designated by the same reference numerals and will not be described in repetition.

FIG. 1 is a cross-sectional view showing an example of a cross-sectional structure of a motor including a rotor of a motor according to an embodiment of the present invention. Hereinafter, a case where the motor is a brushless motor will be exemplarily described, but the motor is not limited to this. As shown in FIG. 1, the brushless motor (hereinafter will be simply referred to as a motor) according to the present embodiment includes a tubular stator 1 attached to an inner wall surface of an outer frame 10 by shrink-fit, etc., and a tubular rotor 2 retained at an inner side of the stator 1 such that the rotor 2 is rotatable with respect to the stator 1. The rotor 2 is provided with a shaft hole 3 in a center portion thereof. In a state in which a shaft (not shown) is inserted into the shaft hole 3, the rotor 2 and the shaft are fastened to each other.

The stator 1 includes a stator core 13 including a yoke 11 of a tubular shape and a plurality of (18 in the present embodiment) teeth 12 extending radially inward from an inner wall surface of the yoke 11, and coils 14 wound around the teeth 12, respectively. The stator core 13 is formed in such a manner that a plurality of plate members (described later) are stacked together. Between each of the teeth 12, i.e., tooth 12 and the corresponding coil 14, an insulating member 15 (see FIG. 2 as will be described later) is provided to electrically insulate them from each other. The rotor 2 includes a tubular rotor core 21 and plate-shaped permanent magnets 22 embedded into a plurality of (six in the present embodiment) slots formed in a circumferential direction of the rotor 2 inside of the rotor core 21. Although in the present embodiment, the coils 14 are exemplarily illustrated as distributed winding formed by winding the wire around a plurality of teeth 12, the present invention is not limited to this. For example, various winding methods, such as wave winding or concentrated winding formed by winding the wire around one tooth 12, may be used.

In the motor configured as described above, when an alternating current is flowed through the coils 14 of the stator 1 to generate rotational magnetic flux, the shaft and the rotor 2 rotate around a rotational axis C which is a center axis of the shaft, with respect to the stator 1.

Figure 2:
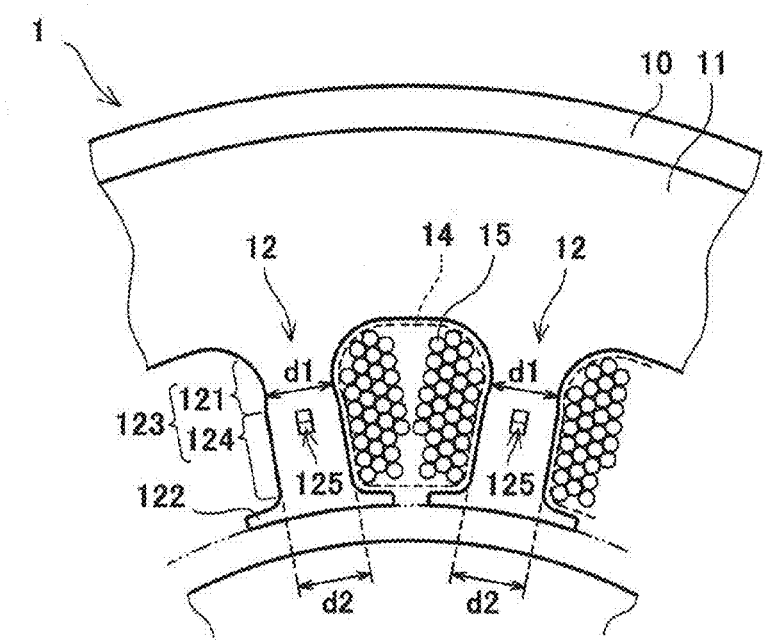
FIG. 2 is a partially enlarged view showing a cross-sectional structure of a stator of the motor of FIG. 1.

FIG. 2 is a partially enlarged view showing a cross-sectional structure of the stator of the motor of FIG. 1. In FIG. 2, representation of a part of the coils 14 and the insulating members 15 is omitted. As shown in FIG. 2, each of the teeth 12, i.e., tooth 12 has a narrower portion 121 having a smaller width than the remaining portion of the tooth 12. Specifically, the tooth 12 has an extending portion 123 extending inward in a radial direction (hereinafter will be simply referred to as radially) of the yoke 11 from the yoke 11 and an increased-width portion 122 formed at a tip end of the extending portion 123 so as to have a greater width than the extending portion 123 in a circumferential direction (hereinafter will be simply referred to as circumferential) of the yoke 11. The extending portion 123 is formed such that its circumferential width is smaller than the circumferential width of the increased-width portion 122. The extending portion 123 is called a magnetic-pole portion, while the increased-width portion 122 is called a magnetic-pole tip end portion. The extending portion 123 has a constant-width portion 124 extending radially in a straight-line shape so as to have a constant circumferential width, and the narrower portion 121 in which its circumferential width d2 is smaller than a circumferential width d2 of the constant-width portion 124. In other words, the extending portion 123 has a shape in which its portion is constricted when viewed in the direction of the rotational axis C. Thus, the narrower portion 121 is formed in a portion of the extending portion 123 such that the circumferential width of the narrower portion 121 is smaller than the circumferential width of the remaining portion of the extending portion 123 (cross-sectional area of the narrower portion 121 which is perpendicular to the radial direction is smaller than that of the constant-width portion 124.

Figure 3:
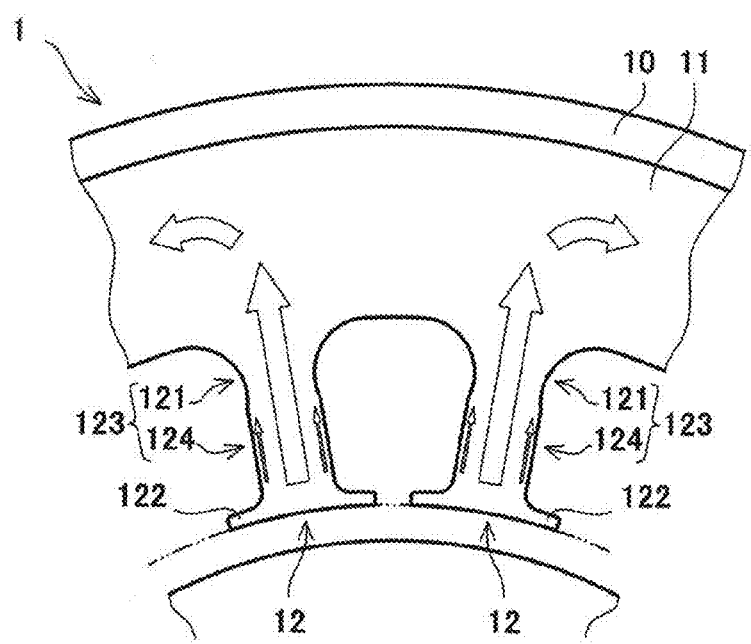
FIG. 3 is a view showing flows of localized portions of magnetic flux in the vicinity of teeth in the stator of the motor of FIG. 1.

Next, advantages achieved by providing the narrower portion 121 in the stator 1 configured as described above will be described. FIG. 3 is a view showing flows of localized portions of the magnetic flux in the vicinity of teeth in the stator of the motor of FIG. 1. In FIG. 3, temporal flows of the magnetic flux are indicated by arrows. For easier understanding, in FIG. 3, the clamp portion 125 (described later) is not shown, and in description in conjunction with FIGS. 3 to 5 as will be described later, an influence of the clamp portion 125 is ignored. In FIG. 3, representation of the coils 14 and the insulating members 15 is omitted. As shown in FIG. 3, the magnetic flux from the rotor 2 flows from the increased-width portion 122 of the tooth 12 into the tooth 12, and further flows to the yoke 11 through the extending portion 123 of the tooth 12. Since the magnetic flux flowing through the tooth 12 is alternating magnetic flux, the magnetic flux may flow in the same manner in directions opposite to the arrows of FIG. 3 (the magnetic flux flowing in the direction from the yoke 11 toward the rotor 2 through the tooth 12 occurs).

Since the narrower portion 121 having a smaller width than the remaining portion of the tooth 12 is provided in a portion of the tooth 12 such that the width of the narrower portion 121 is smaller than the width of the remaining portion of the tooth 12, a density of the magnetic flux flowing through the narrower portion 121 in the tooth 12 increases, and local magnetic saturation occurs in the narrower portion 121, so that the higher harmonic magnetic flux is filtered in the narrower portion 121. More specifically, when the alternating magnetic flux (main magnetic flux) passing through the tooth 12 becomes a local maximum value, a higher harmonic component superposed on the alternating magnetic flux is removed. Because of this, the cross-sectional area of the narrower portion 121 which is perpendicular to the radial direction thereof (direction in which the alternating magnetic flux flows) is desirably sized to allow all of the main magnetic flux which is as much as possible to pass through the narrower portion 121, in the local maximum value of the alternating magnetic flux.

Figure 15:
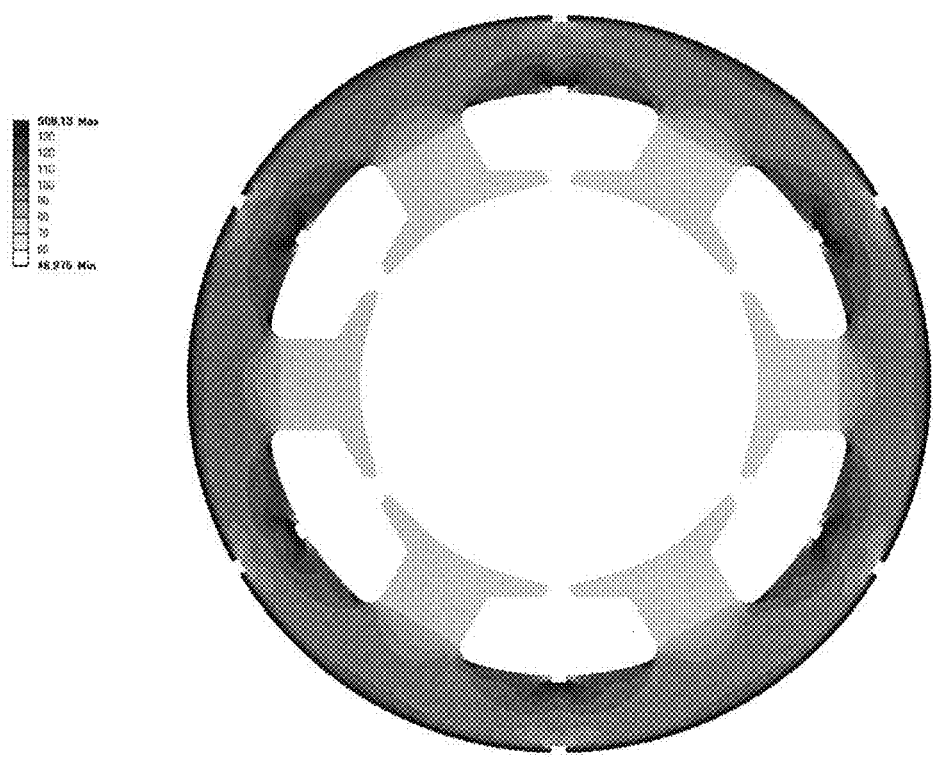
FIG. 15 is a view showing a result of analysis of a stress distribution in a conventional stator.

As shown in the conventional configuration of FIG. 15, a stress due to shrink-fit, etc., is not generated in the tooth 12. Therefore, even when the narrower portion 121 is provided in the tooth 12, a stress exerted on the stator 1 will not increase. Therefore, it becomes possible to prevent a situation in which an iron loss increases due to an increase in a compressive stress exerted on the stator 1. In addition, since the narrower portion 121 is provided in the tooth 12 which is relatively higher in magnetic flux density in the stator 1, only the higher harmonic magnetic flux can be filtered and removed appropriately. Thus, the higher harmonic component of the alternating magnetic flux passing through inside of the tooth 12 is removed to reduce the iron loss, while reduction of a torque constant can be prevented by causing the main magnetic flux to pass through inside of the tooth 12. This makes it possible to suppress an increase in a copper loss due to an increase in the current, a decrease in the motor efficiency can be prevented. As a result, a loss generated in a motor can be reduced, and hence a high-efficient motor can be attained.

Because of the increased-width portion 122, a leakage of the magnetic flux which occurs when the magnetic flux from the rotor 2 is flowing through the stator 1 is reduced in the increased-width portion 122. Besides, the higher harmonic magnetic flux is filtered in the narrower portion 121 having a smaller width than the increased-width portion 122. Therefore, the higher harmonic magnetic flux can be suppressed effectively without reducing the torque constant of the motor. Furthermore, since the constant-width portion 124 is formed in the portion of the extending portion 123 which is other than the narrower portion 121, the higher harmonic magnetic flux can be suppressed effectively in the narrower portion 121 having a smaller circumferential width than the constant-width portion 124 while mitigating the magnetic saturation of the alternating magnetic flux in the constant-width portion 124.

The narrower portion 121 in the present embodiment will be described in more detail. As shown in FIG. 2, the narrower portion 121 is provided at a base end portion (portion near the yoke 11) of the extending portion 123, and the constant-width portion 124 extends radially inward from the tip end of the narrower portion 121. This makes it possible to filter higher harmonic magnetic fluxes of adjacent teeth 12 which are interlinked via the yoke 11. Therefore, the higher harmonic magnetic flux can be suppressed effectively.

The circumferential both end portions of the narrower portion 121 have a circular-arc shape in a cross-section perpendicular to a center axis of the yoke 11. That is, the circular-arc shape is such that the circumferential width of the tooth 12 decreases from the base end portion (portion near the yoke 11) toward the tip end thereof, reaches the smallest circumferential width d2, and then increases to be close to a circumferential width d2 toward the tip end. Since the tooth 12 has such a constriction, the magnetic flux flows gently in the narrower portion 121 and a change amount of magnetic vectors in a connection potion at which the narrower portion 121 is connected to another portion (the constant-width portion 124 or the yoke 11) is reduced. As a result, an increase in the iron loss can be suppressed by the narrower portion 121.

Figure 4:
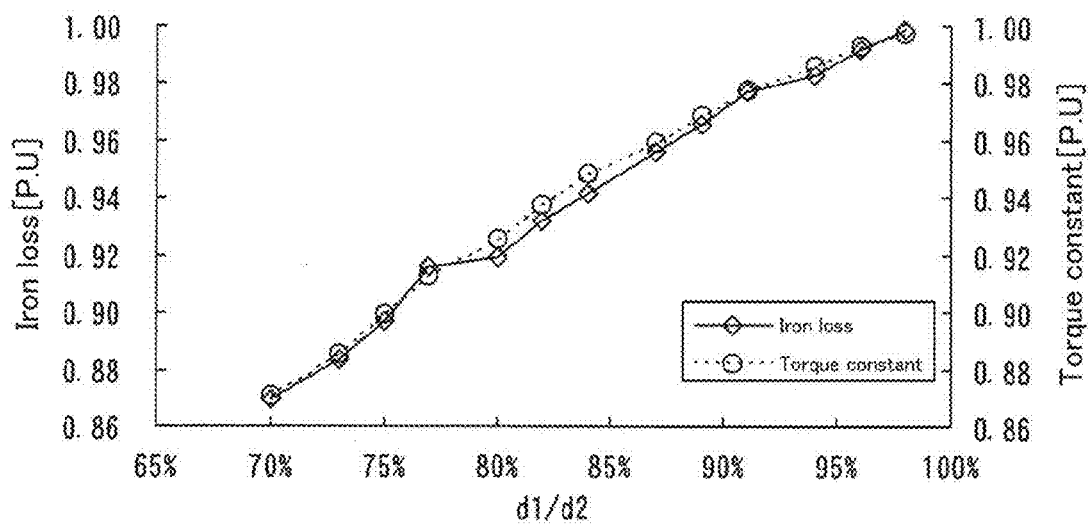
FIG. 4 is a graph showing analysis values of an iron loss and a torque constant in a case where a smallest value d1 of a circumferential width of a narrower portion of each of the teeth is changed with respect to a circumferential width d2 of a constant-width portion in the stator of FIG. 1.
Figure 5:
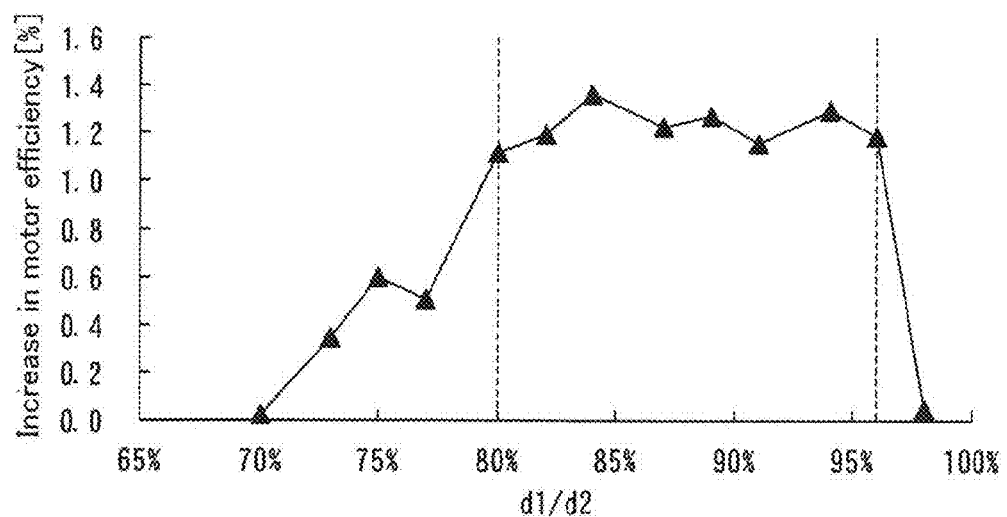
FIG. 5 is a graph showing an analysis value of a motor efficiency in a case where the smallest value d1 of the circumferential width of the narrower portion of each of the teeth is changed with respect to the circumferential width d2 of the constant-width portion in the stator of FIG. 1.

Preferably, a ratio of the smallest value d1 of the circumferential width of the narrower portion 121 with respect to the circumferential width d2 of the constant-width portion 124 is 0.70<d1/d2<0.98. FIG. 4 is a graph showing analysis values of an iron loss and a torque constant in a case where the smallest value d1 of the circumferential width of the narrower portion of each of the teeth is changed with respect to the circumferential width d2 of the constant-width portion in the stator of FIG. 1. FIG. 4 indicates a decrease rate of the iron loss and a decrease rate of the torque constant when the iron loss and the torque constant in a case where there exists no narrower portion (case where the circumferential width from the base end of the extending portion to the tip end of the extending portion is constant) are 1. FIG. 5 is a graph showing an analysis value of a motor efficiency in a case where the smallest value d1 of the circumferential width of the narrower portion of each of the teeth is changed with respect to the circumferential width d2 of the constant-width portion, in the stator of FIG. 1. FIG. 5 shows an increase rate of the motor efficiency from the motor efficiency in the case where there exists no narrower portion (case where the circumferential width from the base end of the extending portion to the tip end of the extending portion is constant). FIGS. 4 and 5 show graphical representation of the analysis values when the smallest value d1 of the circumferential width of the narrower portion 121 is changed from 0.7d2 (70%) to 0.98d2 (98%) width respect to the circumferential width d2 of the constant-width portion.

The motor efficiency η is represented by a ratio of a motor output Pout with respect to a motor input Pin (Pout/Pin), and the motor output Pout is a value derived by subtracting a motor loss Ploss from the motor input Pin. Therefore, the motor efficiency η is expressed as η=(Pin−Ploss)/Pin. The motor loss Ploss is a sum of an iron loss Wf and a copper loss Wc (Wf+Wc), and the copper loss Wc is expressed as Wc=I$^2$·R using a motor current I and a winding resistance R of the coil 14. A torque τ of the motor is expressed as τ=Kτ·I using a torque constant Kτ, and therefore the motor current I is expressed as τ/Kτ. Therefore, the motor efficiency η is expressed as η=1−(Wf+(τ/K)$^2$·R)/Pin. From this, it may be said that when the iron loss Wf decreases and the torque constant Kτ increases, the motor efficiency η increases.

As shown in FIG. 4, when a ratio of the smallest value d1 of the circumferential width of the narrower portion 121 with respect to the circumferential width d2 of the constant-width portion 124 is equal to or greater than 98% (0.98≤d1/d2≤1.0), an effect of reducing the iron loss is not provided, whereas when the ratio of the smallest value d1 with respect to the circumferential width d2 is less than 98%, the effect of reducing the iron loss is provided. As the smallest value d1 of the circumferential width of the narrower portion 121 is smaller with respect to the circumferential width d2 of the constant-width portion 124 in the case where the smallest value d1 of the circumferential width of the narrower portion 121 with respect to the circumferential width d2 of the constant-width portion 124 is less than 98%, the iron loss is reduced more, but the torque constant is reduced. When considering the motor efficiency with reference to FIG. 5, in a case where the ratio of the smallest value d1 of the circumferential width of the narrower portion 121 with respect to the circumferential width d2 of the constant-width portion 124 is equal to or less than 70%, the iron loss is reduced, but an adverse effect resulting from reduction of the torque constant is noticeable as compared to an effect provided by reduction of the iron loss (i.e., the copper loss is increased), so that the motor efficiency is not increased (the increase rate of the motor efficiency is 0).

In view of the above, by setting the ratio of the smallest value d1 of the circumferential width of the narrower portion 121 with respect to the circumferential width d2 of the constant-width portion 124 to 0.70<d1/d2<0.98, the iron loss can be reduced without reducing the torque constant in a motor of an equal size, and as a result, a high-efficient motor can be attained. In particular, when the ratio of the smallest value d1 of the circumferential width of the narrower portion 121 with respect to the circumferential width d2 of the constant-width portion 124 is in a range of 0.80<d1/d2<0.96, the increase rate of the motor efficiency becomes greater. Therefore, by setting the ratio of d1/d2 to this range, the motor efficiency can be further increased.

In the present embodiment, as described above, the stator core 13 is formed in such a way that the plurality of plate members (as will be described later) are stacked together. Therefore, as shown in FIGS. 1 and 2, the constant-width portion 124 of the extending portion 123 is provided with the clamp portion 125 for securing the plurality of plate members to each other.

The clamp portion 125 is constituted by locally bent portions provided in the respective plate members of the plurality of plate members which are stacked together. The locally bent portions provided in the respective plate members are fitted to each other to secure the plurality of plate members stacked together, to each other. Therefore, the configuration of the locally bent portions is not particularly limited so long as the plurality of plate members are fitted to each other in a state in which they are stacked together. The locally bent portions can be formed using a known processing method, and a forming method of the locally bent portions is not particularly limited.

For example, as described below, the clamp portion 125 is formed by press-forming of the constant-width portion 124 in a state in which the plurality of plate members 130 (see FIG. 6) are stacked together. It should be noted that, for easier diagrammatic representation, the ratio of the size of the clamp portion 125 shown in FIGS. 1, 2, or the like, with respect to the size of the constant-width portion 124 is different from that of an actual structure, and the present invention is not limited to the illustrated ratio.

Figure 6A:
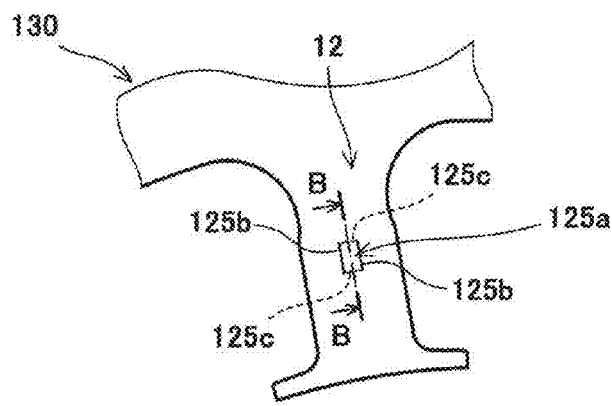
FIG. 6A is a view showing manufacturing steps of a stator core of the stator of the motor of FIG. 1.
Figure 6B:
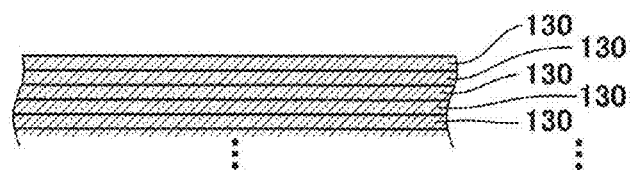
FIG. 6B is a view showing manufacturing steps of the stator core of the stator of the motor of FIG. 1.
Figure 6C:
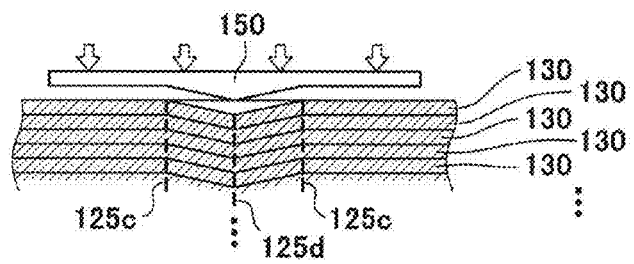
FIG. 6C is a view showing manufacturing steps of the stator core of the stator of the motor of FIG. 1.
Figure 6D:
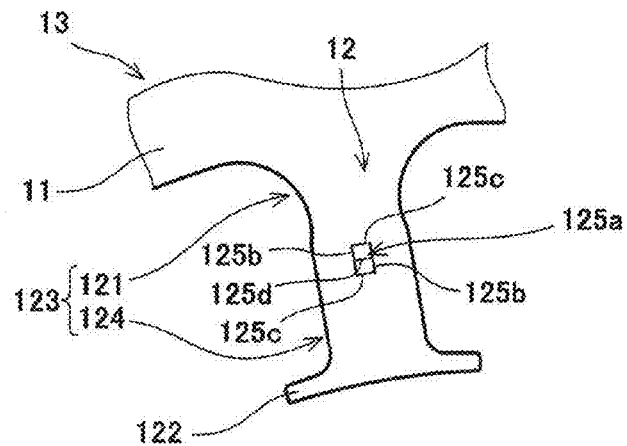
FIG. 6D is a view showing manufacturing steps of the stator core of the stator of the motor of FIG. 1.

Now, an example of a manufacturing method of the stator core 13 of the present embodiment will be described. FIGS. 6A to 6D are views showing the manufacturing steps of the stator core of the stator of the motor of FIG. 1. FIG. 6A is a partially enlarged top plan view showing a state in which incisions are formed in a portion of the plate members where the clamp portion is to be formed. FIG. 6B is a cross-sectional view taken along B-B of FIG. 6A, showing a state in which the plurality of plate members are stacked together. FIG. 6C is a cross-sectional view taken along B-B of FIG. 6A, showing a state in which the plurality of plate members stacked together are pressed. FIG. 6D is a partially enlarged top plan view showing a state (state in which the stator core is formed) in which the plurality of plate members are secured to each other by pressing.

A region 125a in which the clamp portion 125 is to be formed is set in advance in a portion of a region which will become the constant-width portion 124 in the state in which the plurality of plate members 130 are stacked together. As shown in FIG. 6A, in the present embodiment, the region 125a includes a pair of first sides 125b extending in an extending direction (radial direction) of the constant-width portion 124 and defining a circumferential width of the clamp portion 125 and a pair of second sides 125c extending in a direction orthogonal to the first sides 125b and defining a radial length of the clamp portion 125. In other words, the region 125a has a rectangular region defined by the pair of first sides 125b and the pair of second sides 125c. Thus, the clamp potion 125 has a square shape or a rectangular shape in which the first sides 125b are longer than the second sides 125c.

Initially, in the step of FIG. 6A, the shape (shape including the yokes 11 and the teeth 12) of the stator core 13 is cut out by punching the plurality of plate members 130 such as the electromagnetic steel plates. At this time, the incisions are formed in the pair of first sides 125b which are a portion of the region 125a such that the incisions penetrate the plate members 130.

Next, in the step of FIG. 6B, the plurality of plate members 130 formed in the step of FIG. 6A are stacked together. At this time, the plurality of plate members 130 are positioned so that the positions of the region 125a in which the clamp portion 125 is to be formed conform to each other, among the plurality of plate members 130.

Then, in the step of FIG. 6C, in a state in which the plurality of plate members 130 are stacked together, a convex press machine 150 presses an obverse surface of the plurality of plate members 130 stacked together, to deform the region 125a. In the present embodiment, the plurality of plate members 130 are bent at the pair of second sides 125c and a third side 125d parallel to the second sides 125c within the region 125a so that a portion of one of the plate members 130 is engaged with (fitted to) another one of the plate members 130 with which the one plate member 130 is in contact, and thus they are swaged. This allows the plurality of plate members 130 to be secured to each other. In this example, the clamp portion 125 is formed in such a manner that a portion of the plate members 130 which surrounds the clamp portion 125 and both sides of the clamp portion 125 are cut, and the clamp portion 125 has bent portions having linear fold lines.

In the above described manner, as shown in FIG. 6D, the clamp portion 125 is formed in the constant-width portion 124 of the extending portion 123 of the stator core 13 such that its center portion is recessed relative to its radial base end portion and its radial tip end portion. In the clamp portion 125 formed in the stator core 13, a residual stress due to the deformation exists, and therefore, its magnetic characteristic degrades. Therefore, it is necessary to dispose the clamp portion 125 so that the degradation of a motor characteristic is difficult to occur.

After intensive study, the inventors of the present invention found out that in a case where the narrower portion 121 is provided in a portion of the tooth 12 of the stator 1, a decrease in a torque constant can be prevented by providing the clamp portion 125 for securing the plurality of plate members 130 to each other in a location of the constant-width portion 124. It is estimated that it becomes possible to prevent an increase in the copper loss by providing the clamp portion 125 in the constant-width portion 124, in a case where the extending portion 123 including the narrower portion 121 is provided with the clamp portion 125. Specifically, a main magnetic flux passing through the tooth 12 is greater in the case where the clamp portion 125 is provided in the constant-width portion 124 than in the case where the clamp portion 125 is provided in the narrower portion 121. As described above, by providing the narrower portion 121, the iron loss can be reduced while preventing a decrease in the motor output. In addition, by providing the clamp portion 125 in the constant-width portion 124, it becomes possible to reduce the copper loss while preventing a reduction of the main magnetic flux passing through the tooth 12. Therefore, by providing the narrower portion 121 in the extending portion 123 of the stator core 13 and by providing the clamp portion 125 in the constant-width portion 124, a loss generated in a motor can be reduced, and as a result, a high-efficient motor can be attained.

To attain a high motor efficiency, a radial position of the clamp portion 125 is desirably such that an end portion of the clamp portion 125 which is closer to the narrower portion 121 is in the vicinity of a boundary between the narrower portion 121 and the constant-width portion 124.

Figure 7:
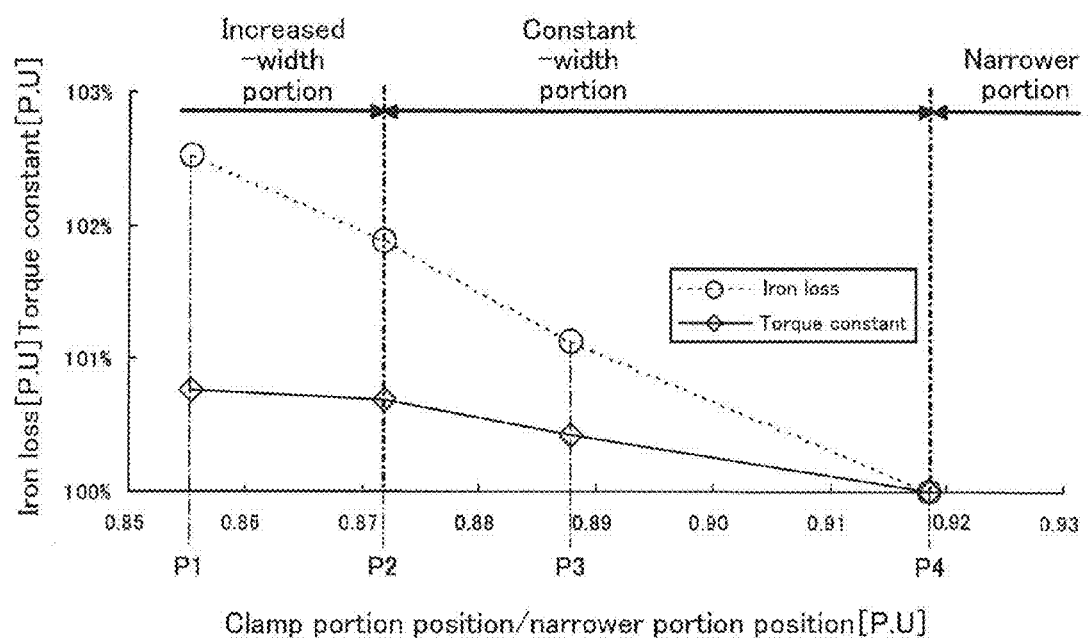
FIG. 7 is a graph showing analysis values of an iron loss and a torque constant in a case where a radial position of a clamp portion is changed with respect to an extending portion in the stator of FIG. 1.
Figure 8:
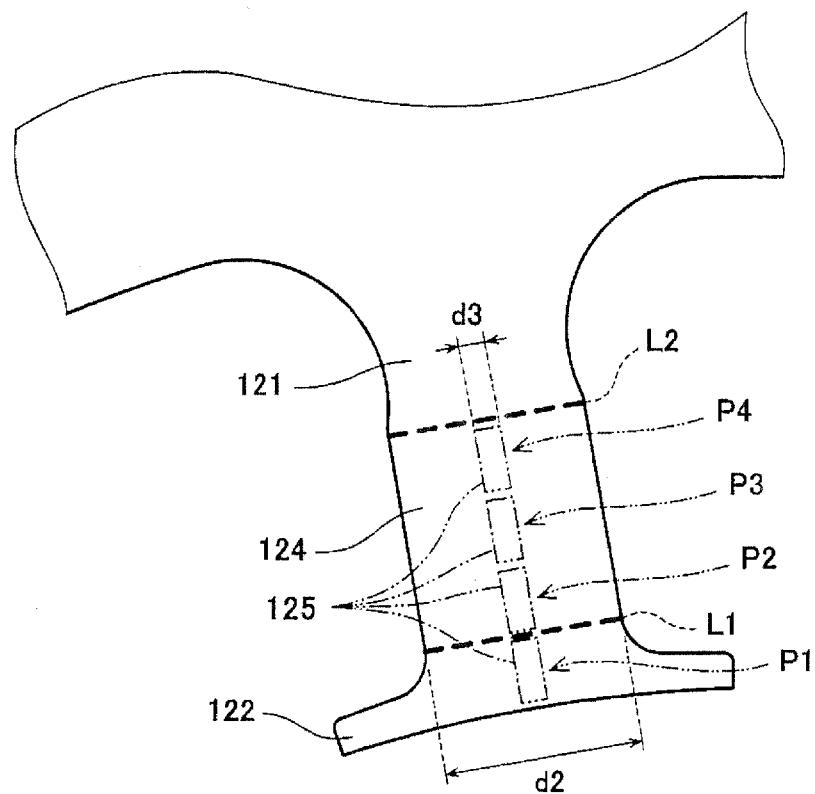
FIG. 8 is a schematic view showing the radial position of the clamp portion with respect to the extending portion in the graph FIG. 7.

FIG. 7 is a graph showing analysis values of the iron loss and the torque constant in a case where the radial position of the clamp portion is changed with respect to the extending portion in the stator of FIG. 1. FIG. 8 is a schematic view showing the radial position of the clamp portion with respect to the extending portion in the graph of FIG. 7. FIG. 7 shows an increase rate of the iron loss and an increase rate of the torque constant in a case where the radial position of the clamp portion 125 is changed with respect to the iron loss (100%) and the torque constant (100%) in a case where the end portion of the clamp portion 125 which is closer to the narrower portion 121 is in the vicinity of a boundary L2 between the narrower portion 121 and the constant-width portion 124 (case where the clamp portion 125 is located in a position P4 in FIG. 8). FIG. 7 shows a relative position of a radially inner end portion (distant from the narrower portion 121) of the clamp portion 125 as the radial position of the clamp portion 125 with respect to the position of the narrower portion 121, in a case where a distance from a center of the stator to a boundary L2 between the narrower portion 121 and the constant-width portion 124, is 1.

Figure 9:
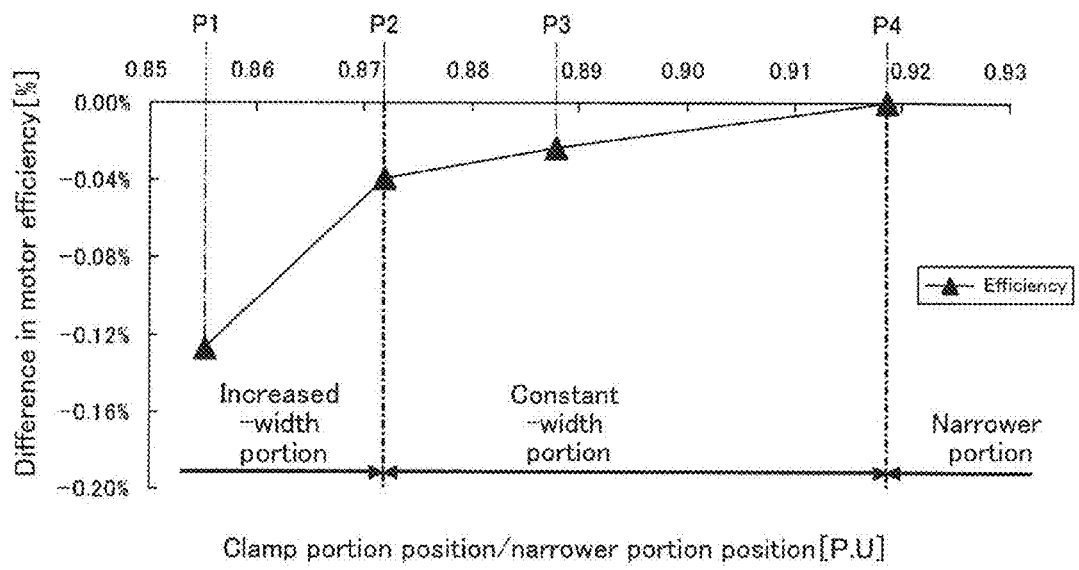
FIG. 9 is a graph showing an analysis value of a motor efficiency in a case where the radial position of the clamp portion is changed with respect to the extending portion in the stator of FIG. 1.

FIG. 9 is a graph showing an analysis value of a motor efficiency in a case where the radial position of the clamp portion is changed with respect to the extending portion in the stator of FIG. 1. FIG. 9 shows an increase in the motor efficiency with respect to the motor efficiency as a reference in a case where the end portion (second side 125c at radially outer side in FIG. 6D) of the clamp portion 125 which is closer to the narrower portion 121 is located at the boundary L2 between the narrower portion 121 and the constant-width portion 124 (case where the clamp portion 125 is located in the position P4). FIGS. 7 and 9 are graphical representation of analysis values corresponding to positions P 1 to P4, which are obtained when the end portion of the clamp portion 125 of an equal size and the same shape, which end portion is closer to the narrower portion 121, changes from a boundary L1 between the constant-width portion 124 and the increased-width portion 122 to the boundary L2 between the narrower portion 121 and the constant-width portion 124.

As shown in FIG. 7, as the radial position of the clamp portion 125 is more distant from the narrower portion 121, a cross-sectional area of the constant-width portion 122 and of the narrower portion 121 in which the main magnetic flux passes increases (copper loss decreases), and the torque constant increases. However, an increase rate of the iron loss is greater than an increase rate of the torque constant. With reference to FIG. 9, the motor efficiency is reviewed as follows. As the clamp portion 125 is more distant from the narrower portion 121, the motor efficiency decreases. When the position of the clamp portion 125 shifts toward the increased-width portion 122 beyond the boundary L1 between the constant-width portion 124 and the increased-width portion 122, the torque constant decreases noticeably (i.e., increase rate of the copper loss increases), and the motor efficiency decreases significantly.

As should be appreciated from above, by providing the clamp portion 125 in the constant-width portion 124, the loss generated in the motor can be reduced, and as a result, the high-efficient motor can be attained. Furthermore, by providing the clamp portion 125 outside of the narrower portion 121 and in a portion of the constant-width portion 124 which is closest to the narrower portion 121, a decrease in the torque constant can be suppressed to a minimum level while preventing an increase in the iron loss. In particular, a motor having a characteristic in which the copper loss has a higher contribution rate than the iron loss for the motor efficiency, is able to effectively prevent a decrease in the motor efficiency by setting the radial position of the clamp portion 125 within the above range.

Moreover, to attain a high motor efficiency, it is desirable that the circumferential width of the clamp portion 125 be equal to or less than a half of the circumferential width of the constant-width portion 124.

Figure 10:
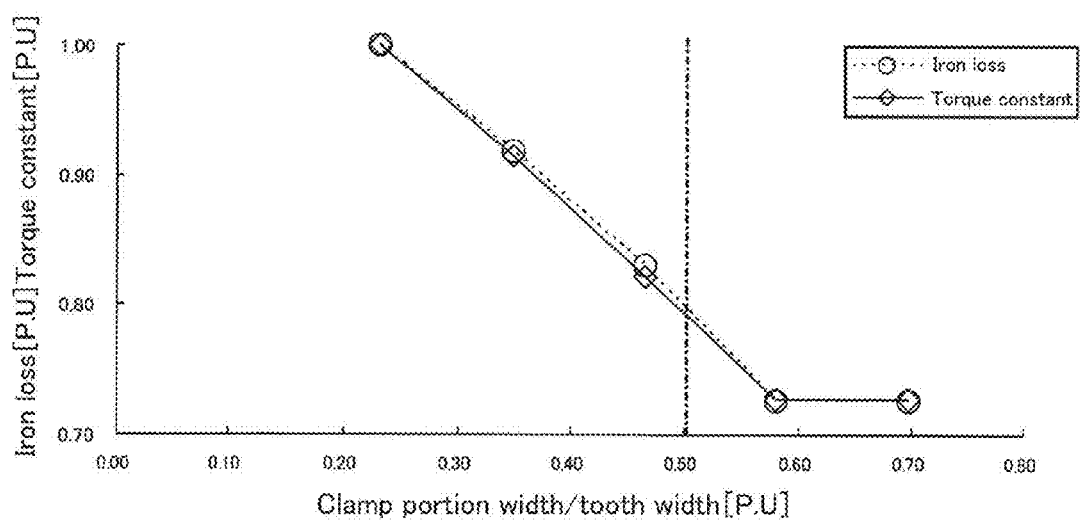
FIG. 10 is a graph showing analysis values of the iron loss and the torque constant in a case where a circumferential width of the clamp portion is changed with respect to a tooth width in the stator of FIG. 1.
Figure 11:
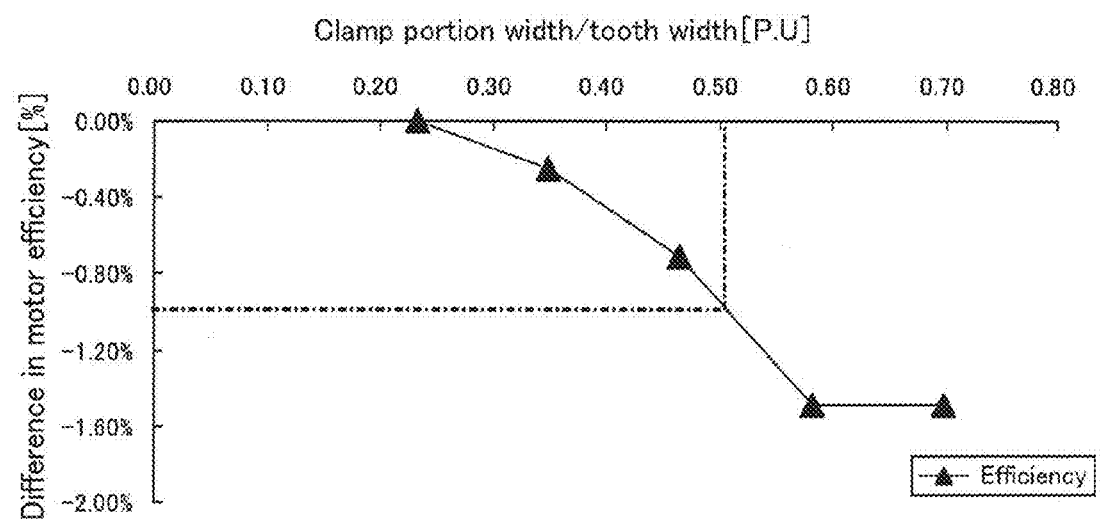
FIG. 11 is a graph showing an analysis value of a motor efficiency in a case where a circumferential width of the clamp portion is changed with respect to a tooth width in the stator of FIG. 1.

FIG. 10 is a graph showing analysis values of the iron loss and the torque constant in a case where the circumferential width of the clamp portion is changed with respect to a tooth width in the stator of FIG. 1. FIG. 11 is a graph showing an analysis value of the motor efficiency in a case where a circumferential width of the clamp portion is changed with respect to a tooth width in the stator of FIG. 1. FIG. 10 shows a decrease rate of the iron loss and a decrease rate of the torque constant in a case where the circumferential width of the clamp portion 125 is changed with respect to the iron loss (100%) and the torque constant (100%) in a case where a ratio of a circumferential width d3 (see FIG. 8) of the clamp portion 125 with respect to a tooth width, i.e., a circumferential width d2 (see FIG. 8) of the constant-width portion 124, is 0.23. FIG. 11 shows a decrease in the motor efficiency with respect to the motor efficiency as a reference in the case where the ratio of the circumferential width d3 of the clamp portion 125 with respect to the tooth width, i.e., the circumferential width d2 of the constant-width portion 124, is 0.23. FIGS. 10 and 11 are graphical representations of the analysis value in a case where the circumferential width d3 of the clamp portion 125 of an equal radial length is gradually increased.

As can be seen from FIG. 10, as the circumferential width d3 of the clamp portion 125 increases relative to the circumferential width d2 of the constant-width portion 124, a cross-sectional area of the constant-width portion 124 in which the main magnetic flux passes decreases, and hence the torque constant decreases. As a result, the copper loss increases. By comparison, as the circumferential width d3 of the clamp portion 125 increases relative to the circumferential width d2 of the constant-width portion 124, the iron loss reduces. FIG. 10 shows changes in which the decrease rate of the torque constant and the decrease rate of the iron loss are substantially the same. In a case where the motor outputs an equal torque, a required current increases as the torque constant decreases. That is, in a case where the motor outputs an equal torque, the torque constant and the current have an inverse proportion relationship. This implies that a decrease in the torque constant and an increase in the current have the same meaning. As described above, the copper loss is proportional to a square of the current, and therefore a decrease in the torque constant means a significant increase in the copper loss. As can be seen from the graph of FIG. 10, the increase rate of the copper loss is much greater as compared to the decrease rate of the iron loss. That is, as the circumferential width d3 of the clamp portion 125 increases, this affects more the main magnetic flux passing through the constant-width portion 124, and the copper loss increases more noticeably. Therefore, as shown in FIG. 11, the motor efficiency decreases as the circumferential width d3 of the clamp portion 125 increases. If the circumferential width d3 of the clamp portion is equal to or more than a half of the circumferential width d2 of the constant-width portion 124, the motor efficiency decreases 1.0% or more.

Therefore, by setting the circumferential width d3 of the clamp portion 125 equal to or less than a half of the circumferential width d2 of the constant-width portion 124, it becomes possible to effectively lessen an effect on the main magnetic flux passing through inside of the extending portion 123, which would be caused by the residual stress generated by providing the clamp portion 125. In particular, a motor having a characteristic in which the copper loss has a higher contribution rate than the iron loss for the efficiency, is able to effectively prevent a decrease in the motor efficiency by setting the circumferential width of the clamp portion 125 within the above range.

Figure 12A:
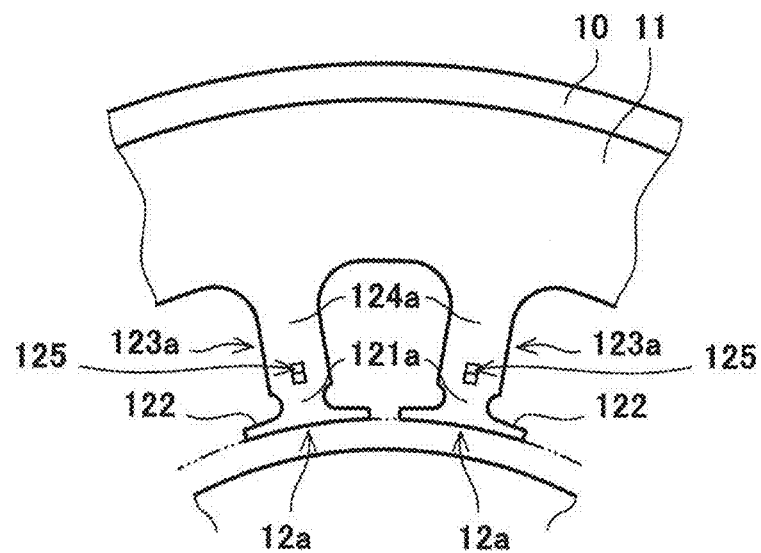
FIG. 12A is a partially enlarged view showing an example of a cross-sectional structure of a stator according to a modified example of Embodiment 1 of the present invention.
Figure 12B:
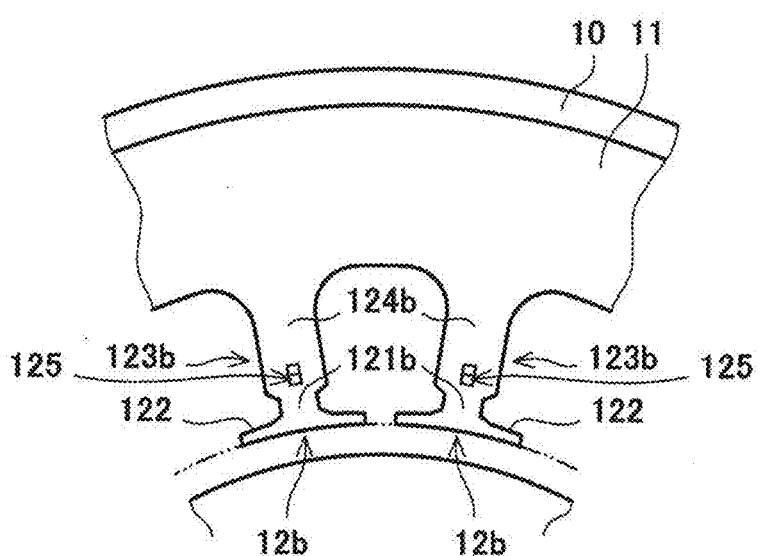
FIG. 12B is a partially enlarged view showing an example of a cross-sectional structure of a stator according to a modified example of Embodiment 1 of the present invention.

Although in the present embodiment, the narrower portion 121 is provided at a base end side of the extending portion 123 of the tooth 12, the present invention is not limited to this. FIGS. 12A and 12B are partially enlarged views each showing an example of a cross-sectional structure of a stator according to a modified example of Embodiment 1 of the present invention. In FIGS. 12A and 12B, representation of the coils 14 and the insulating members 15 is omitted.

In each of the modified examples of FIGS. 12A and 12B, a narrower portion 121a is provided at a tip end side (location distant from the yoke 11) of an extending portion 123a of a tooth 12a. Specifically, in the modified example of FIG. 12A, the extending portion 123a includes a constant-width portion 124a extending radially inward from the yoke 11 and the narrower portion 121a provided between the constant-width portion 124a and the increased-width portion 122 at the tip end.

In the modified example of FIG. 12B, circumferential both end portions of a narrower portion 121b of an extending portion 123b, in the cross-section perpendicular to the center axis of the yoke 11, have an angular shape. In the present modified example, like the modified example of FIG. 12A, the narrower portion 121b is provided at a tip end side of the extending portion 123b of a tooth 12b. The shape of the narrower portion 121b in the present modified example is applicable to the example in which the narrower portion 121 is provided at a base end side relative to the constant-width portion 124 as shown in FIG. 2.

The above described modified examples can achieve advantages similar to those of the above described embodiment.

Example 1

Hereinafter, a description will be given of results of analysis of the iron loss and the torque constant, for the stator (Example 1) provided with the narrower portions 121 described in the above embodiment, in the teeth 12 of the stator 1, and stators which were not provided with narrower portions in teeth (Comparative example 1, Comparative example 2). As the comparative examples, used were a stator comprising teeth each including a constant-width portion extending in a radial direction of a yoke and a tip end portion having a greater width than the constant-width portion such that the circumferential width of the constant-width portion was equal to d2 described with reference to FIG. 4 (Comparative example 1), and a stator comprising teeth each including a constant-width portion extending in a radial direction of a yoke and a tip end portion having a greater width than the constant-width portion such that the circumferential width of the constant-width portion was 0.93d2 (Comparative example 2). As Example 1, used was the stator 1 in which the circumferential width of the constant-width portion 124 was the above d2 and the circumferential width of the narrower portion 121 was 0.93d2. The other configurations of the stator (number of teeth, width of the yoke, etc.) were identical among Example 1, Comparative example 1 and Comparative example 2. In Example 1, an influence of the clamp portion 125 is ignored.

Figure 13:
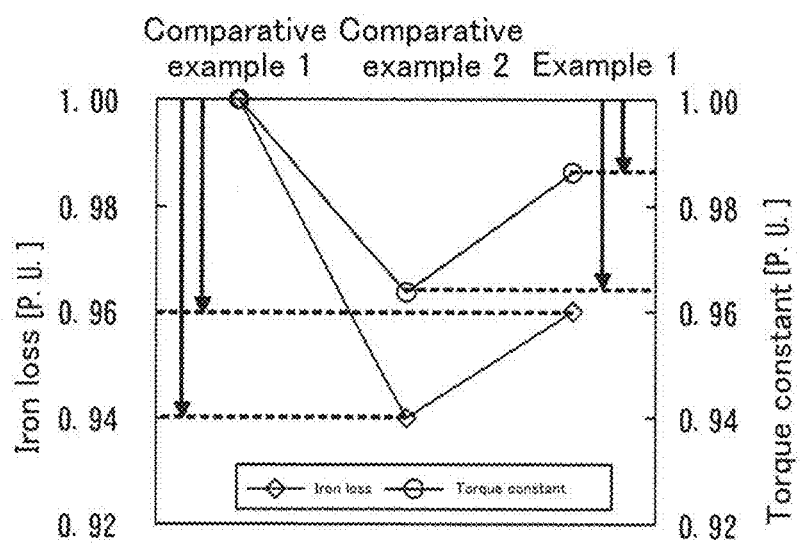
FIG. 13 is a graph showing analysis values of an iron loss and a torque constant of a stator of Example 1 of the present invention in comparison with those of comparative examples.

FIG. 13 is a graph showing analysis values of the iron loss and the torque constant of the stator in Example 1 of the present invention in comparison with those of comparative examples. FIG. 13 indicates a decrease rate of the iron loss and a decrease rate of the torque constant in each of Comparative example 2 and Example 1 when the iron loss and the torque constant in Comparative example 1 were 1.

As shown in FIG. 13, the iron loss in Comparative example 2 was less by about 6% than the iron loss in Comparative example 1. From this, it was found that the iron loss could be reduced by reducing the circumferential width of the teeth. However, in this case, the torque constant in Comparative example 2 was less about 4% than the torque constant in Comparative example 1, which resulted in a case where the motor efficiency could not be increased.

On the other hand, as shown in FIG. 13, in Example 1, the iron loss was less by about 4% than in Comparative example 1, while the torque constant was less by about 1% than in Comparative example 1. From this, it was revealed that a high-efficient motor was implemented, which could reduce the iron loss while preventing a decrease in an output of the motor, by providing the narrower portions 121 in the teeth 12.

Figure 14:
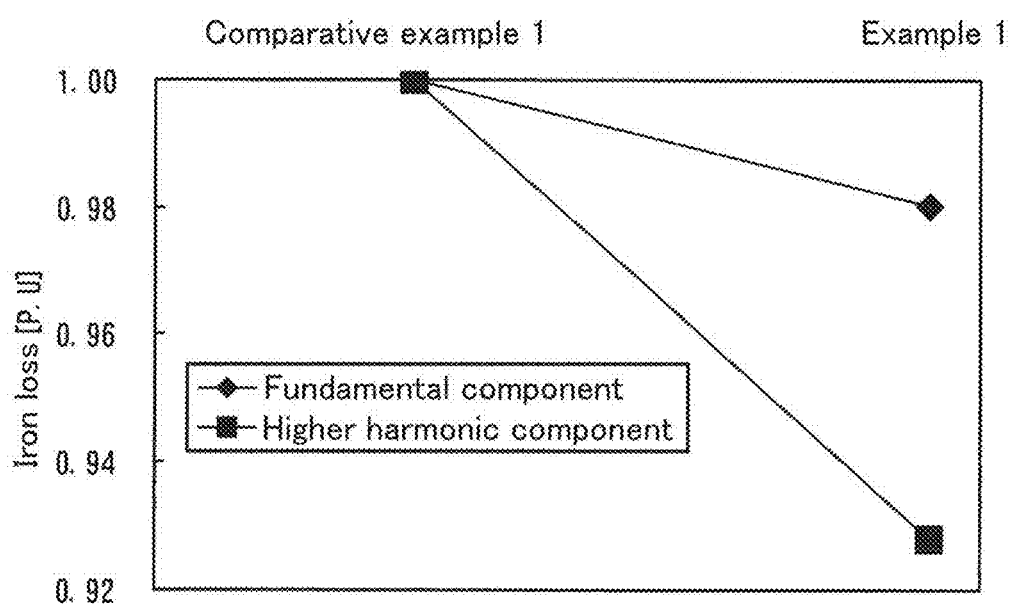
FIG. 14 is a graph showing an analysis value of the iron loss of the stator of Example 1 of the present invention, for respective frequency components.

Furthermore, it was verified by analysis that the iron loss made less in Example 1 than in Comparative example 1 was associated with the higher harmonic component (harmonic magnetic flux) or associated with a fundamental component (main magnetic flux), using their decrease rates. FIG. 14 is a graph showing the analysis value of the iron loss of the stator of Example 1 of the present invention, for respective frequency components. FIG. 14 indicates the decrease rate of the iron loss associated with the fundamental component and the decrease rate of the iron loss associated with the higher harmonic component in Example 1, in a case where the iron loss associated with the fundamental component and the iron loss associated with the higher harmonic component in Comparative example 1 were 1.

As shown in FIG. 14, the iron loss associated with the fundamental component and the iron loss associated with the higher harmonic component were less in Example 1 than in Comparative example 1. The decrease rate of the iron loss associated with the fundamental component was as small as about 2%, while the decrease rate of the iron loss associated with the higher harmonic component was as great as 7%. Therefore, it was revealed that by providing the narrower portions 121 in the teeth 12, the iron loss associated with the higher harmonic magnetic flux could be suppressed effectively, while maintaining the main magnetic flux.

Thus far, the embodiment of the present invention has been described. The present invention is not limited to the above embodiment and the embodiment can be improved, changed or modified in various ways without departing from a spirit of the invention.

Although in the above embodiment, for example, the narrower portions 121 are provided at both sides of each of the teeth 12 in the circumferential direction of the yoke 11, the present invention is not limited to this. For example, the narrower portion 121 may be provided only at one side of each of the teeth 12 in the circumferential direction of the yoke 11.

Although in the above embodiment, the narrower portions 121 are provided in all of the teeth 12 included in the stator 1, the present invention is not limited to this. The narrower portions 121 may be provided in some of the plurality of teeth 12. The number of the teeth 12, another shape of the teeth 12, the shape of the yoke 11, etc., may be suitably set.

Although in the above embodiment, the clamp portions 125 are provided in all of the teeth 12 constituting the stator 1, respectively, the present invention is not limited to this, and the clamp portions 125 may be provided in some of the plurality of teeth 12, respectively. Or, a plurality of clamp portions 125 may be provided in one tooth 12. Also, the shape and size of the clamp portion 125 may be suitably set.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

A stator of a motor of the present invention and a motor including the stator are useful in reduction of a loss generated in a motor and achievement of a high-efficient motor.

The invention claimed is:

1. A stator of a motor comprising a stator core including a plurality of plate members stacked together, wherein each of the plurality of plates is of a unitary structure having a yoke and teeth,
  the yoke being of a tubular shape, and
  the teeth each extending radially inwardly from the yoke, each tooth having an extending portion and an increased-width portion formed at a tip end of the extending portion and having a greater circumferential width than that of the extending portion,
  wherein the extending portion has (i) a constant-width portion extending radially in a straight-line shape with a circumferential width (d2) that is constant along a radial length of the constant-width portion, (ii) a narrower portion narrowed from the constant-width portion to filter out a high harmonic magnetic flux by causing local magnetic saturation within the teeth, the narrowed portion having a circumferential width (d1) smaller than the circumferential width (d2) of the constant-width portion, and (iii) a clamp portion formed to secure the plurality of plate members together and having a radial length defined by first and second radial ends, wherein the first radial end is situated radially inwardly from the second radial end; and
  wherein the clamp portion is provided in the constant-width portion so that the first radial end of the clamp portion is located at a bound between the constant-width portion and the narrowed portion.

2. The stator of the motor according to claim 1, wherein the clamp portion comprises a locally bent portion formed with locally bent parts of the plate members.

3. The stator of the motor according to claim 1, wherein the clamp portion is configured to have a circumferential width equal to or less than a half of the circumferential width (d2) of the constant-width portion.

4. The stator of the motor according to claim 1, wherein the narrower portion is formed adjacent to a base end portion of the extending portion; and
  wherein the constant-width portion continues radially inward from the narrower portion.

5. The stator of the motor according to claim 1, wherein the narrower portion has a pair of grooves of an arcuate cross-section formed at the same radial height in both of circumferential end surfaces of the extending portion, the narrower portion having the circumferential width (d1) at the bottoms of the arcuate grooves.

6. The stator of the motor according to claim 1, wherein the narrower portion is configured such that a ratio between the circumferential width (d1) of the narrower portion and the circumferential width (d2) of the constant-width portion is within a range of $0.70 < d1/d2 < 0.98$.

7. A motor including the stator of the motor as recited in claim 1.

8. The stator of the motor according to claim 1, wherein the clamp portion is formed only in the teeth and not formed in the yoke.

* * * * *